United States Patent
Togård et al.

(10) Patent No.: US 12,483,883 B2
(45) Date of Patent: Nov. 25, 2025

(54) SECURE HANDLING OF HARDWARE ACTIVATION CODES

(71) Applicant: Telefonaktiebolaget LM Ericsson (publ), Stockholm (SE)

(72) Inventors: Patricia Togård, Sollentuna (SE); Tommy Arngren, Södra Sunderby (SE); Bernard Smeets, Dalby (SE)

(73) Assignee: TELEFONAKTIEBOLAGET LM ERICSSON, PLLC, Stockholm (SE)

( * ) Notice: Subject to any disclaimer, the term of this patent is extended or adjusted under 35 U.S.C. 154(b) by 408 days.

(21) Appl. No.: 17/294,192

(22) PCT Filed: Nov. 22, 2018

(86) PCT No.: PCT/EP2018/082232
§ 371 (c)(1),
(2) Date: May 14, 2021

(87) PCT Pub. No.: WO2020/104032
PCT Pub. Date: May 28, 2020

(65) Prior Publication Data
US 2022/0014910 A1  Jan. 13, 2022

(51) Int. Cl.
*H04W 12/06*  (2021.01)
*H04L 9/40*  (2022.01)
(Continued)

(52) U.S. Cl.
CPC ......... *H04W 12/06* (2013.01); *H04L 63/0869* (2013.01); *H04W 12/03* (2021.01); *H04W 12/0431* (2021.01)

(58) Field of Classification Search
CPC . H04W 12/06; H04W 12/03; H04W 12/0431; H04W 12/08; H04L 63/0869; H04L 63/10
See application file for complete search history.

(56) References Cited

U.S. PATENT DOCUMENTS

2011/0166968 A1* 7/2011 Houng ............... H04N 21/4432
705/30
2011/0173443 A1* 7/2011 Osterwalder ......... H04L 63/123
713/168
(Continued)

FOREIGN PATENT DOCUMENTS

| JP | 2004164007 A | * | 6/2004 |
| WO | 3040922 A1 | | 7/2016 |
| WO | 2017027133 A1 | | 2/2017 |

OTHER PUBLICATIONS

Chakrabarti, S. et al., "Intel® SGX Enabled Key Manager Service with OpenStack Barbican", Intel Developer Zone, Dec. 2017, pp. 1-28.

*Primary Examiner* — Alexander Lagor
*Assistant Examiner* — Lydia L Noel
(74) *Attorney, Agent, or Firm* — COATS & BENNETT, PLLC

(57) ABSTRACT

There is provided mechanisms for obtaining a HWAC for a baseband node. A method is performed by a network planner node. The method comprises performing mutual authentication between a TEE of the network planner node and a TEE of the baseband node. The method comprises providing, towards the TEE of the baseband node, a request for HWAC calculation data based on a network resource need. The method comprises obtaining, from the TEE of the baseband node, the requested HWAC calculation data. The method comprises obtaining the HWAC by inputting the obtained HWAC calculation data and a quantification of the network resource need to a HWAC calculation function on the TEE of the network planner node, where the HWAC is given as output from the HWAC calculation function. The method comprises providing, towards the TEE of the baseband node, the HWAC.

20 Claims, 6 Drawing Sheets

(51) Int. Cl.
*H04W 12/03* (2021.01)
*H04W 12/0431* (2021.01)

(56) References Cited

U.S. PATENT DOCUMENTS

| | | | |
|---|---|---|---|
| 2011/0225643 A1* | 9/2011 | Faynberg | G06F 21/31 726/10 |
| 2014/0317686 A1* | 10/2014 | Vetillard | G06F 21/74 726/2 |
| 2016/0212012 A1* | 7/2016 | Young | H04L 41/0816 |
| 2016/0277930 A1* | 9/2016 | Li | H04L 63/0838 |
| 2017/0041793 A1* | 2/2017 | Lee | G06F 21/00 |
| 2018/0139612 A1* | 5/2018 | Rhelimi | H04W 12/08 |
| 2018/0183802 A1* | 6/2018 | Choyi | G06Q 20/383 |
| 2020/0112854 A1* | 4/2020 | Namiranian | H04M 1/72445 |
| 2020/0145493 A1* | 5/2020 | Wang | H04L 67/56 |

* cited by examiner

SECURE HANDLING OF HARDWARE ACTIVATION CODES

TECHNICAL FIELD

Embodiments presented herein relate to a method, a network planner node, a computer program, and a computer program product for obtaining a hardware activation code (HWAC) for a baseband node. Embodiments presented herein further relate to a method, a baseband node, a computer program, and a computer program product for verifying a HWAC.

BACKGROUND

Manufactures of mobile network provide software and hardware to Mobile Network Operators (MNO) to be used in their infrastructure for the mobile network. The use of software and hardware might be under governance of license agreements that not only allow the MNOs to use the hardware and software but also limit the use or describe how license fees are to be computed. Coupled to such agreements are mechanism in the hardware and software that are involved in the process of enforcing the licenses and in the process of collecting and computing data that is used in the computation of fees that are paid.

Hard Ware Activation Codes (HWAC) is a concept to control hardware capabilities in network baseband nodes. Combination of different pieces of information could be needed to correctly calculate the HWAC needed for a given baseband node.

Data needed to calculate the HWAC (hereinafter denoted as HWAC calculation data) should be stored in a secure manner at the entity that performs the HWAC computation. But it can be difficult to store the HWAC calculation data needed to calculate the HWAC at the entity that performs the HWAC computation without unwanted access (read/write) to the HWAC calculation data. At the same time, it is required to allow access (read) to the calculated HWAC itself that results from the computation, without access to the HWAC calculation data.

Hence, there is still a need for an improved handling of HWAC related data.

SUMMARY

An object of embodiments herein is to provide efficient handling of HWAC related data that is not associated with the issues noted above, or at least where these issues are mitigated or reduced.

According to a first aspect there is presented a method for obtaining a HWAC for a baseband node. The method is performed by a network planner node. The method comprises performing mutual authentication between a TEE of the network planner node and a TEE of the baseband node. The method comprises providing, towards the TEE of the baseband node, a request for HWAC calculation data based on a network resource need. The method comprises obtaining, from the TEE of the baseband node, the requested HWAC calculation data. The method comprises obtaining the HWAC by inputting the obtained HWAC calculation data and a quantification of the network resource need to a HWAC calculation function on the TEE of the network planner node, where the HWAC is given as output from the HWAC calculation function. The method comprises providing, towards the TEE of the baseband node, the HWAC.

According to a second aspect there is presented a network planner node for obtaining a HWAC for a baseband node. The network planner node comprises processing circuitry. The processing circuitry is configured to cause the network planner node to perform mutual authentication between a TEE of the network planner node and a TEE of the baseband node. The processing circuitry is configured to cause the network planner node to provide, towards the TEE of the baseband node, a request for HWAC calculation data based on a network resource need. The processing circuitry is configured to cause the network planner node to obtain, from the TEE of the baseband node, the requested HWAC calculation data. The processing circuitry is configured to cause the network planner node to obtain the HWAC by inputting the obtained HWAC calculation data and a quantification of the network resource need to a HWAC calculation function on the TEE of the network planner node, where the HWAC is given as output from the HWAC calculation function. The processing circuitry is configured to cause the network planner node to provide, towards the TEE of the baseband node, the HWAC.

According to a third aspect there is presented a network planner node for obtaining a HWAC for a baseband node. The network planner node comprises an authentication module configured to perform mutual authentication between a TEE of the network planner node and a TEE of the baseband node. The network planner node comprises a provide module (210b) configured to provide, towards the TEE of the baseband node, a request for HWAC calculation data based on a network resource need. The network planner node comprises an obtain module configured to obtain, from the TEE of the baseband node, the requested HWAC calculation data. The network planner node comprises an obtain module configured to obtain the HWAC by inputting the obtained HWAC calculation data and a quantification of the network resource need to a HWAC calculation function on the TEE of the network planner node, where the HWAC is given as output from the HWAC calculation function. The network planner node comprises a provide module configured to provide, towards the TEE of the baseband node, the HWAC.

According to a fourth aspect there is presented a computer program for obtaining a HWAC for a baseband node, the computer program comprises computer program code which, when run on processing circuitry of a network planner node, causes the network planner node to perform a method according to the first aspect.

According to a fifth aspect there is presented a method for verifying a HWAC the method is performed by a baseband node. The method comprises performing mutual authentication between a TEE of the baseband node and a TEE of a network planner node. The method comprises obtaining, from the TEE of the network planner node, a request for HWAC calculation data. The method comprises providing, towards the TEE of the network planner node, the requested HWAC calculation data. The method comprises obtaining (S210), from the TEE of the network planner node, the HWAC. The method comprises triggering activation of hardware resources corresponding to the HWAC only when having successfully verified correctness of the HWAC in a HWAC verification function on the TEE of the baseband node.

According to a sixth aspect there is presented a baseband node for verifying a HWAC. The baseband node comprises processing circuitry. The processing circuitry is configured to cause the baseband node to perform mutual authentication between a TEE of the baseband node and a TEE of a network planner node. The processing circuitry is configured to cause the baseband node to obtain, from the TEE of the network planner node, a request for HWAC calculation data. The processing circuitry is configured to cause the baseband node to provide, towards the TEE of the network planner node, the requested HWAC calculation data. The processing circuitry is configured to cause the baseband node to obtain, from the TEE of the network planner node, the HWAC. The processing circuitry is configured to cause the baseband node to trigger activation of hardware resources corresponding to the HWAC only when having successfully verified correctness of the HWAC in a HWAC verification function on the TEE of the baseband node.

According to a seventh aspect there is presented a baseband node for verifying a HWAC. The baseband node comprises an authentication module configured to perform mutual authentication between a TEE of the baseband node and a TEE of a network planner node. The baseband node comprises an obtain module configured to obtain, from the TEE of the network planner node, a request for HWAC calculation data. The baseband node comprises a provide module configured to provide, towards the TEE of the network planner node, the requested HWAC calculation data. The baseband node comprises an obtain module configured to obtain, from the TEE of the network planner node, the HWAC. The baseband node comprises a trigger module configured to trigger activation of hardware resources corresponding to the HWAC only when having successfully verified correctness of the HWAC in a HWAC verification function on the TEE of the baseband node.

According to an eight aspect there is presented a computer program for verifying a HWAC, the computer program comprising computer program code which, when run on processing circuitry of a baseband node, causes the baseband node to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these methods, these network planner nodes, these baseband nodes, these computer programs, and this computer program product provide efficient handling of HWAC related data.

Advantageously these methods, these network planner nodes, these baseband nodes, these computer programs, and this computer program product enable HWAC calculation data to be distributed between the baseband node and the network planner node in a secure manner.

Advantageously these methods, these network planner nodes, these baseband nodes, these computer programs, and this computer program product enable efficient computation of the HWAC without unnecessary exposure of the HWAC calculation data.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As disclosed above, there is still a need for an improved handling of HWAC related data.

The embodiments disclosed herein therefore relate to mechanisms for obtaining a HWAC for a baseband node 300a, 300b, 300N and for verifying a HWAC. In order to obtain such mechanisms there is provided a network planner node 200, a method performed by the network planner node 200, a computer program product comprising code, for example in the form of a computer program, that when run on processing circuitry of the network planner node 200, causes the network planner node 200 to perform the method. In order to obtain such mechanisms there is further provided a baseband node 300a, 300b, 300N, a method performed by the baseband node 300a, 300b, 300N, and a computer program product comprising code, for example in the form of a computer program, that when run on processing circuitry of the baseband node 300a, 300b, 300N, causes the baseband node 300a, 300b, 300N to perform the method.

Figure 1:
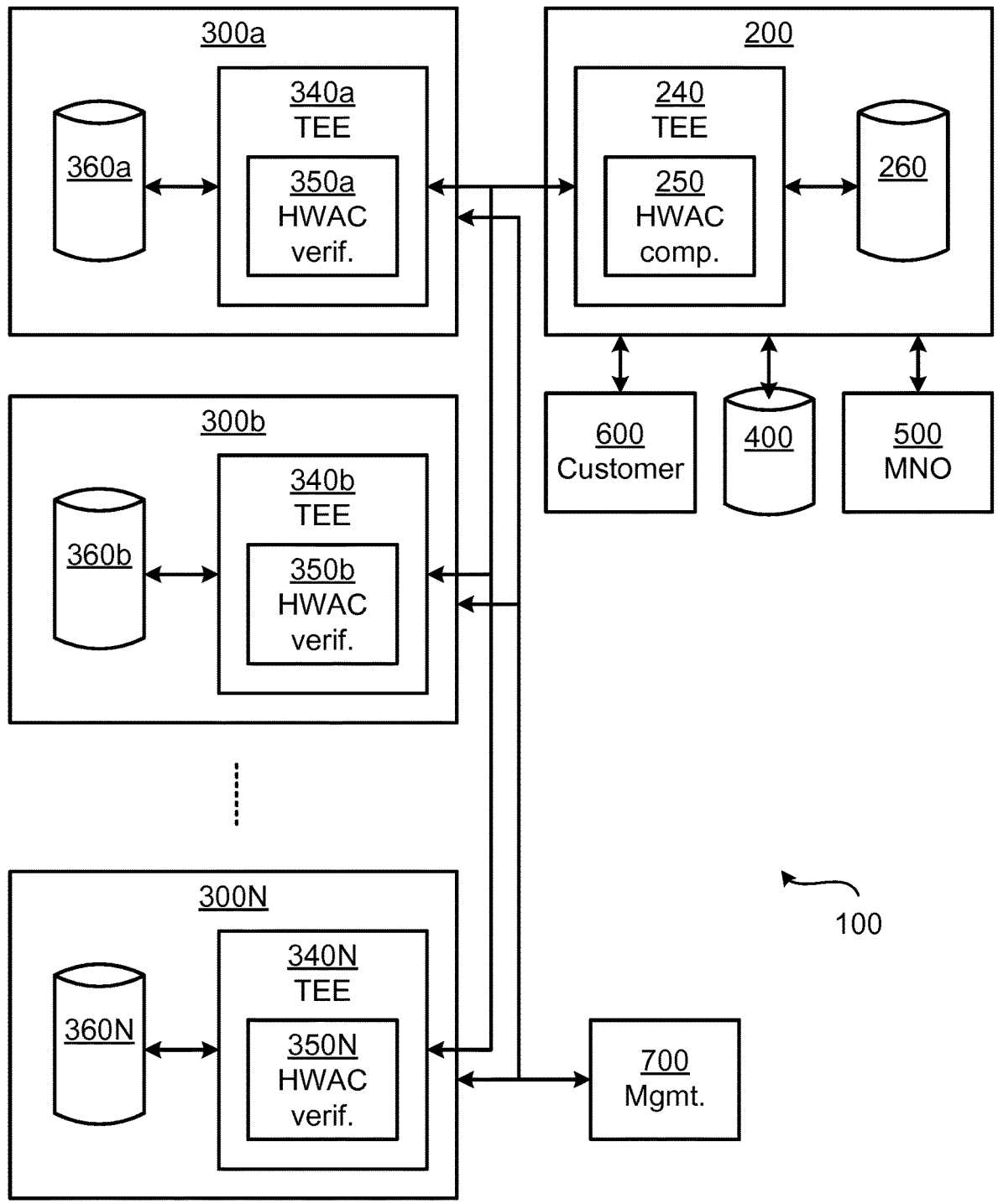
FIG. 1 is a schematic diagram illustrating a system according to embodiments.

FIG. 1 is a schematic diagram illustrating a system 100 where embodiments presented herein can be applied. The system 100 comprises a network planner node 200 and a number of baseband nodes 300a, 300b, 300N. The network planner node 200 and the baseband nodes 300a, 300b, 300N are configured to communicate with each other. The network planner node 200 could be part of services that help the mobile network operator to determine the HWAC needed for setting up the network equipment comprising a baseband node 300a, 300b, 300N. The network planner could also be part of a commercial discussion support system to determine the HWAC needed to meet a certain desired performance.

Each of the baseband nodes 300a, 300b, 300N could be part of a radio access network node, radio base station, base transceiver station, node B, evolved node B, g node B, access point, or access node.

The network planner node 200 comprises a TEE 240 and an internal storage 260. The TEE 240 of the network planner node 200 could be an enclave instance. In turn, each of the baseband nodes 300a, 300b, 300N comprises its own TEE 340a, 340b, 340N and internal storage 360a, 360b, 360N. Each TEE 340a, 340b, 340N of the baseband nodes 300a, 300b, 300N could be an enclave instance. The TEEs 240, 340a, 340b, 340N need not to be of the same type as long as the Tee 240 is enabled to communicate with the TEEs 340a, 340b, 340N.

In general terms, a TEE 240, 340a, 340b, 340N is a secure area of a main processor. It guarantees code and data loaded inside to be protected with respect to confidentiality and integrity. A TEE 240, 340a, 340b, 340N as an isolated execution environment provides security features such as isolated execution, integrity of applications executing with the TEE 240, 340a, 340b, 340N, along with confidentiality of their assets. In general terms, the TEE 240, 340a, 340b, 340N offers an execution space that provides a higher level of security than a rich mobile operating system open (mobile OS) and more functionality than a so-called secure element (SE).

The network planner node 200 is further configured to communicate with an external storage 400, a mobile network operator database 500, and a customer database 600. For example, as will be further disclosed below, the network planner node 200 might be configured to store data in the storage 400 and fetch data from the mobile network operator database 500 and the customer database 600. In turn, each of the baseband nodes 300a, 300b, 300N is configured to communicate with a network management node 700.

For example, as will be further disclosed below, each of the baseband nodes 300a, 300b, 300N might be configured to fetch data from the network management node 700.

Figure 2:
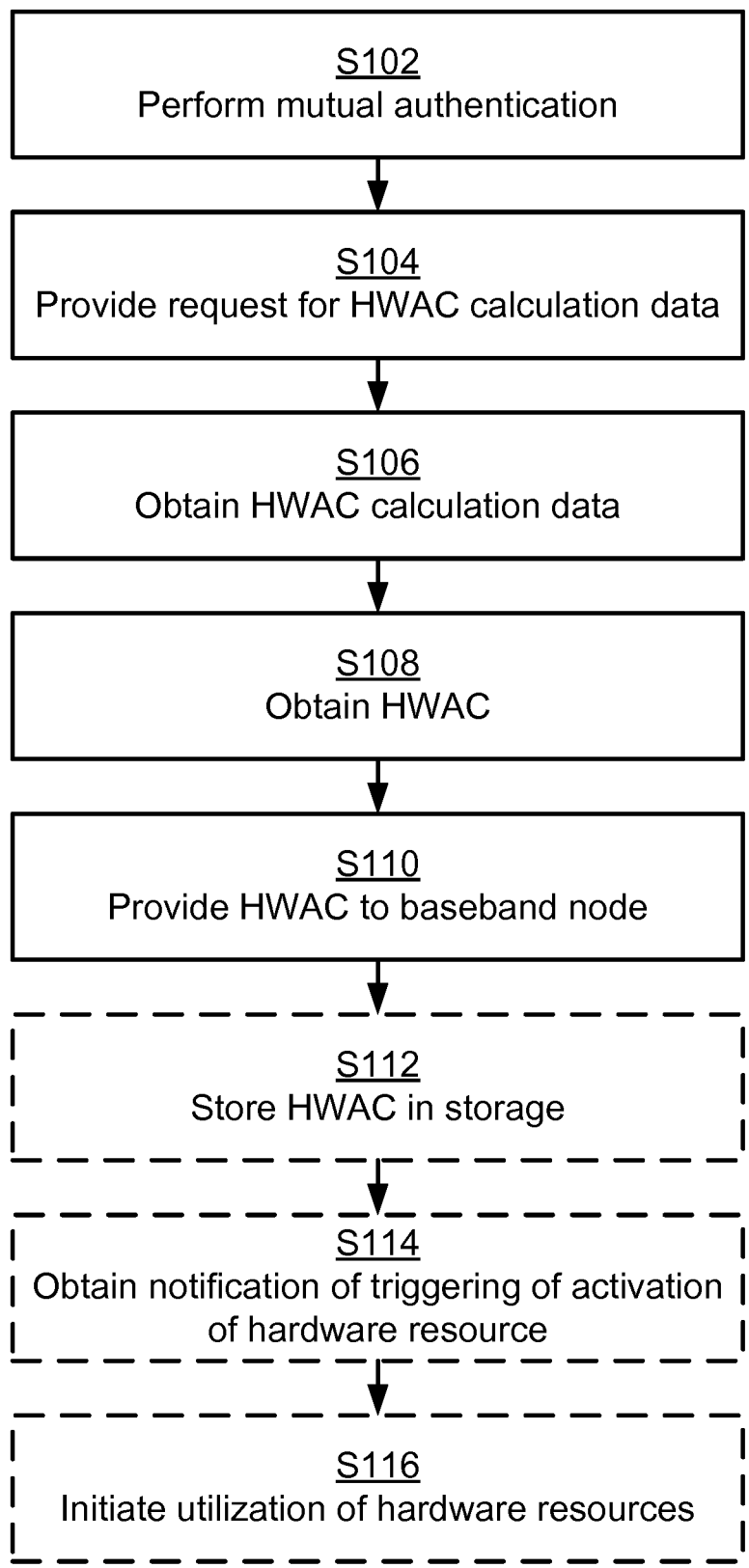
FIGS. 2 and 3 are flowcharts of methods according to embodiments.

Reference is now made to FIG. 2 illustrating a method for obtaining a HWAC for a baseband node 300a, 300b, 300N as performed by the network planner node 200 according to an embodiment.

Mutual authentication is needed in order for the network planner node 200 to obtain the HWAC for the baseband node 300a, 300b, 300N. Hence, the network planner node 200 is configured to perform step S102:

S102: The network planner node 200 performs mutual authentication between the TEE 240 of the network planner node 200 and the TEE 340a, 340b, 340N of the baseband node 300a, 300b, 300N.

Once authenticated, the network planner node 200 requests HWAC calculation data that is used to derive the HWAC. Particularly, the network planner node 200 is configured to perform step S104:

S104: The network planner node 200 provides, towards the TEE 340a, 340b, 340N of the baseband node 300a, 300b, 300N, a request for HWAC calculation data based on a network resource need.

Different examples of network resource need will be provided below. It is assumed that the baseband node 300a, 300b, 300N provides the requested HWAC calculation data towards the network planner node 200. Thus, the network planner node 200 is configured to perform step S106:

S106: The network planner node 200 obtains, from the TEE 340a, 340b, 340N of the baseband node 300a, 300b, 300N, the requested HWAC calculation data.

The network planner node 200 then uses the requested HWAC calculation data and the network resource need to derive the HWAC. Particularly, the network planner node 200 is configured to perform step S108:

S108: The network planner node 200 obtains the HWAC by inputting the obtained HWAC calculation data and a quantification of the network resource need to a HWAC calculation function 250 on the TEE 240 of the network planner node 200. The HWAC is given as output from the HWAC calculation function 250.

Once having obtained the HWAC, the HWAC is provided to the baseband node 300a, 300b, 300N. Particularly, the network planner node 200 is configured to perform step S110:

S110: The network planner node 200 provides, towards the TEE 340a, 340b, 340N of the baseband node 300a, 300b, 300N, the HWAC.

Embodiments relating to further details of obtaining a HWAC for a baseband node 300a, 300b, 300N as performed by the network planner node 200 will now be disclosed.

There could be different ways in which the provision of the requested HWAC calculation data can be improved.

In some aspects the request in step S104 is accompanied by information of the network resource need. This could limit the amount of requested HWAC calculation data that is provided from the baseband node 300a, 300b, 300N to the network planner node 200. Particularly, according to an embodiment, the request is accompanied by the quantification of the network resource need. The requested HWAC calculation data is then only valid for the quantification of the network resource need.

Further, in some aspects the HWAC calculation data is encrypted before being provided towards the network planner node 200. This could increase the security of the provision of the requested HWAC calculation data.

Particularly, according to an embodiment, the HWAC calculation data as obtained from the TEE 340a, 340b, 340N of the baseband node 300a, 300b, 300N is encrypted. The HWAC calculation data is then decrypted on the TEE 240 of the network planner node 200 before being inputted to the HWAC calculation function 250.

There could be different ways in which the provision of the HWAC can be improved.

In some aspects the HWAC is signed before being provided to the baseband node 300a, 300b, 300N. Particularly, according to an embodiment, the HWAC is signed using a key on the TEE 240 of the network planner node 200 before being provides towards the TEE 340a, 340b, 340N of the baseband node 300a, 300b, 300N. The key is shared between the TEE 240 of the network planner node 200 and the TEE 340a, 340b, 340N of the baseband node 300a, 300b, 300N. In other words, the TEE 240 of the network planner node 200 and the TEE 340a, 340b, 340N of the baseband node 300a, 300b, 300N have access to the same key; but the key is not necessarily exchanged between the TEE 240 of the network planner node 200 and the TEE 340a, 340b, 340N of the baseband node 300a, 300b, 300N. In this respect, an agreement of which shared key to use for this purpose might be reached as part of the mutual authentication in step S102.

There could be different types of network resource needs. In some aspects the network resource need given by mobile network operator data. The mobile network operator data might be obtained by the network planner node 200 from the mobile network operator database 500. Non-limiting examples of the hardware resource include, but are not limited to, digital units and radio units that are to be assigned to a mobile network standard, e.g. in 2G, 3G, 4G, or 5G telecommunication systems, or a narrowband Internet of Things (IoT) telecommunication system that is to be activated, and/or how much traffic load is allowed to flow through the digital units or specific radio units.

There could be different ways to represent the HWAC calculation data. Particularly, according to an embodiment, the HWAC calculation data is part of tabularized HWAC calculation data.

Further details of the HWAC calculation function 250 will now be disclosed.

In some aspects more data than defined by the thus inputted HWAC calculation data and quantification of network resource need. Particularly, according to an embodiment, quantification of at least one further parameter is inputted to the HWAC calculation function 250. There could be different examples of such at least one further parameter. For example, information that is customer specific can be inputted. Particularly, according to an embodiment, the at least one further parameter is defined by customer specific values. The customer specific values might be obtained by the network planner node 200 from the customer database 600. Non-limiting examples of the hardware resource include, but are not limited to, how much spectrum the customer can use, and/or how much capacity the customer wants to have for a standard specific service.

There could be different types of HWAC calculation functions 250. In some aspects the HWAC calculation function 250 is a mapping function. Particularly, according to an embodiment, the HWAC calculation function 250 is provides as mapping between a given combination of HWAC calculation data and quantification of network resource need and a given HWAC. Each given combination of HWAC calculation data and quantification of network resource need could thus correspond to an index in a set of indices, where each index in the set of indices corresponds to its own given HWAC. Hence, in some aspects the HWAC calculation function 250 is implemented a table look-up function. Further, based on a price model, the requested services in terms of which standards are to be used and requested capacities, as well as the baseband hardware configuration and parameters, a function will compute the HWAC. Typically, the function will compute the HWAC in a manner such that not more resources are used than necessary to meet capacity demands for each of the standards to be activated and contractual upper limits on the capacity to be given.

In some aspects the HWAC is stored for further verification. Particularly, according to an embodiment the network planner node 200 is configured to perform (optional) step S112:

S112: The network planner node 200 stores the HWAC in a storage 400 outside the TEE 240 of the network planner node 200.

As will be further disclosed below, in some aspects the baseband node 300a, 300b, 300N informs the network planner node 200 that activation of hardware resources, corresponding to the HWAC, has been triggered.

Particularly, according to an embodiment the network planner node 200 is configured to perform (optional) step S114:

S114: The network planner node 200 obtains a notification from the baseband node 300a, 300b, 300N that activation of hardware resources corresponding to the HWAC has been triggered.

The network planner node 200 might utilize the hardware resources. Particularly, according to an embodiment the network planner node 200 is configured to perform (optional) step S116:

S116: The network planner node 200 initiates utilization of the hardware resources to fulfil the network resource need in response thereto (i.e., in response to having obtained the notification in step S114).

There could be different ways according to which the mutual authentication is performed in step S102. In some aspects the mutual authentication is a Transport Layer Security (TLS) mutual handshake procedure, a Diffie-Hellman key exchange procedure, or a Kerberos procedure. Particularly, according to an embodiment, performing the mutual authentication involves the TEE 240 of the network planner node 200 to perform a TLS mutual handshake procedure, or Diffie-Hellman key exchange procedure, or a Kerberos procedure with the TEE 340a, 340b, 340N of the baseband node 300a, 300b, 300N.

Figure 3:
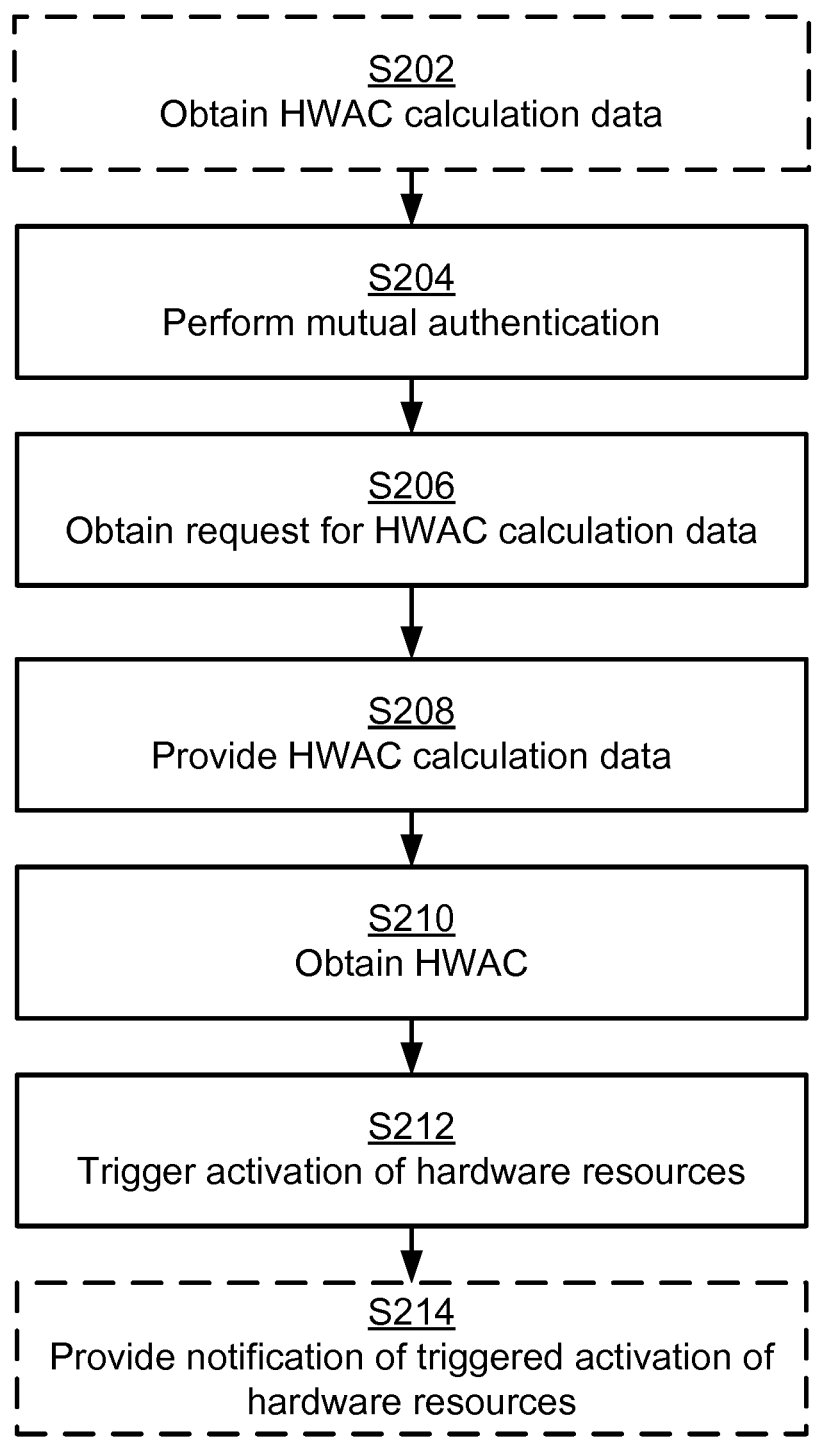

Reference is now made to FIG. 3 illustrating a method for verifying a HWAC as performed by the baseband node 300a, 300b, 300N according to an embodiment.

As disclosed above, mutual authentication is needed in order for the network planner node 200 to obtain the HWAC for the baseband node 300a, 300b, 300N. Hence, the baseband node 300a, 300b, 300N is configured to perform step S204:

S204: The baseband node 300a, 300b, 300N performs mutual authentication between the TEE 340a, 340b, 340N of the baseband node 300a, 300b, 300N and the TEE 240 of a network planner node 200.

As disclosed above, once authenticated, the network planner node 200 requests HWAC calculation data that is used to derive the HWAC. Particularly, the baseband node 300a, 300b, 300N is configured to perform step S206:

S206: The baseband node 300a, 300b, 300N obtains, from the TEE 240 of the network planner node 200, a request for HWAC calculation data.

The baseband node 300a, 300b, 300N, based on the request, retrieves the requested HWAC calculation data and provides it towards the network planner node 200. Particularly, the baseband node 300a, 300b, 300N is configured to perform step S208:

S208: The baseband node 300a, 300b, 300N provides, towards the TEE 240 of the network planner node 200, the requested HWAC calculation data.

As disclosed above, the network planner node 200 then derives the HWAC and provides it to the baseband node 300a, 300b, 300N. Particularly, the baseband node 300a, 300b, 300N is configured to perform step S210:

S210: The baseband node 300a, 300b, 300N obtains, from the TEE 240 of the network planner node 200, the HWAC.

The baseband node 300a, 300b, 300N then verifies correctness of the HWAC. Only if the HWAC is successfully verified as correct, the baseband node 300a, 300b, 300N triggers activation of hardware resources.

Particularly, the baseband node 300a, 300b, 300N is configured to perform step S212:

S212: The baseband node 300a, 300b, 300N triggers activation of hardware resources corresponding to the HWAC only when having successfully verified correctness of the HWAC in a HWAC verification function 350a, 350b, 350N on the TEE 340a, 340b, 340N of the baseband node 300a, 300b, 300N.

Embodiments relating to further details of verifying a HWAC as performed by the baseband node 300a, 300b, 300N will now be disclosed.

There could be different types of hardware resources for which activation is triggered in step S212. Non-limiting examples of the hardware resource include, but are not limited to, digital processing and/or radio units for the different mobile network standards such as 2G, 3G, 4G, and 5G telecommunication systems, the number and/or type of digital processing units in total and the hardware configuration (which may limit the number of processing units that can be assigned to a radio unit).

There could be different ways in which the correctness of the HWAC can be verified in the HWAC verification function 350a, 350b, 350N. According to some non-limiting examples the correctness of the HWAC is be verified through a digital public-key based signature, such as in a Rivest-Shamir-Adleman (RSA) cryptosystem or Elliptic Curve Digital Signature Algorithm (ECDSA) cryptosystem, verification that checks that the HWAC is indeed for the actual baseband node 300a, 300b, 300N and originates from the correct network planner node 200. Verification may also be based on the use of a message authentication code based signature.

In general terms, the baseband node 300a, 300b, 300N needs to have access to the HWAC calculation data in order to be enabled to provide the requested HWAC calculation data towards the TEE 240 of the network planner node 200 There may be different ways to have access to the HWAC calculation data. In some aspects the HWAC calculation data is obtained from the network management node 700. Particularly, according to an embodiment the baseband node 300a, 300b, 300N is configured to perform (optional) step S204:

S204: The baseband node 300a, 300b, 300N obtaining S202 the HWAC calculation data from the network management node 700.

In other aspects the baseband node 300a, 300b, 300N preconfigured with the HWAC calculation data.

As disclosed above, according to an embodiment, the request is accompanied by a quantification of the network resource need. The baseband node 300a, 300b, 300N could then exclude any remaining HWAC calculation data not applicable for the quantification of the network resource need from complete set of HWAC calculation data. That is, according to this embodiment only the HWAC calculation data valid for the quantification of the network resource need is provided towards the TEE 240 of the network planner node 200. Hence, this could reduce the amount of HWAC calculation data provided to the network planner node 200 can be reduced.

As disclosed above, according to an embodiment, the HWAC calculation data is encrypted on the TEE 340a, 340b, 340N of the baseband node 300a, 300b, 300N before being provided towards the TEE 240 of the network planner node 200. This could increase the security of the provision of the requested HWAC calculation data.

As disclosed above, according to an embodiment, the HWAC obtained from the network planner node 200 is signed using a key, and wherein the key is shared between the TEE 240 of the network planner node 200 and the TEE 340a, 340b, 340N of the baseband node 300a, 300b, 300N.

As disclosed above, according to an embodiment, the HWAC calculation data is part of tabularized HWAC calculation data. The requested HWAC calculation data might then correspond to a subset of all tabularized HWAC calculation data, wherein which part of the tabularized HWAC calculation data to provide in step S208 depends on the request as obtained in step S206.

In some aspects each HWAC corresponds to a utility level. The HWAC might thus take a different value representing how the hardware resources enabled by the HWAC calculation data can be consumed. Particularly, according to an embodiment, each possible HWAC corresponds to a respective utility level in a set of utility values. Each utility level corresponds to an amount of the hardware resources. For example, a first utility level of the HWAC is needed to be able to configure hardware resources configured for serving users at a first data rate, and a second utility level of the HWAC is needed to be able to configure hardware resources configured for serving users at a second data rate. The utility level of the HWAC obtained from the TEE 240 of the network planner node 200 can then be mapped to its corresponding amount of the hardware resources when activation of the hardware resources corresponding to the HWAC is triggered in step S212.

In some aspects the baseband node 300a, 300b, 300N informs the network planner node 200 that the hardware resources have been activated. Particularly, according to an embodiment the baseband node 300a, 300b, 300N is configured to perform (optional) step S214:

S214: The baseband node 300a, 300b, 300N provides a notification towards the network planner node 200 that the activation of the hardware resources has been triggered.

This assumes that the correctness of the HWAC has been successfully verified in step S212. In some aspects the baseband node 300a, 300b, 300N informs the network planner node 200 should the verification of the HWAC fail in step S212.

There could be different ways according to which the mutual authentication is performed in step S204. Particularly, according to an embodiment, performing the mutual authentication involves the TEE 340a, 340b, 340N of the baseband node 300a, 300b, 300N to perform a TLS mutual handshake procedure, or Diffie-Hellman key exchange procedure, or a Kerberos procedure with the TEE 240 of the network planner node 200.

Figure 4:
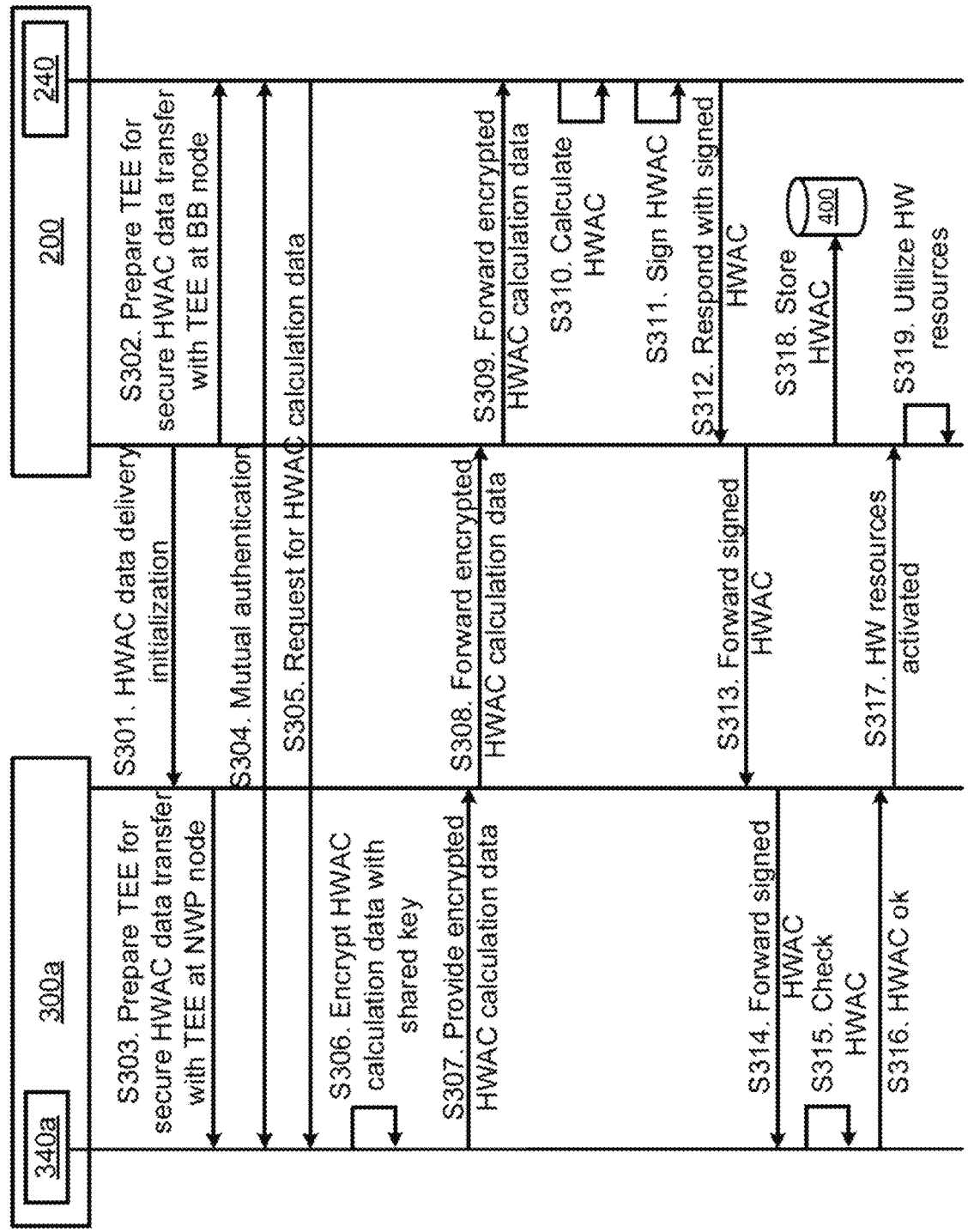
FIG. 4 is a signalling diagram according to an embodiment.

One particular embodiment for obtaining a HWAC for a baseband node 300a, 300b, 300N and for verifying a HWAC based on at least some of the above disclosed embodiments will now be disclosed in detail with reference to the signalling diagram of FIG. 4.

It is assumed that the network planner node 200 is activated and that there is a need for the network planner node 200 to use a HWAC.

S301: The network planner node 200 initiates HWAC data delivery by contacting the baseband node 300a.

S302: The network planner node 200 initiates its local TEE 240 where secure data can be kept and confidential processing can be performed.

S303: The baseband node 300a contacts its TEE 340a to announce that another TEE will commence interaction.

S304: The TEE 240 and the TEE 340a perform mutual authentication. One result is that the TEE 240 and the TEE 340a share the same (secret) key.

S305: Based on the shared key the TEE 240 on behalf of the network planner node 200 requests HWAC calculation data from the TEE 340a of the baseband node 300a.

S306: The TEE 340a encrypts the requested HWAC calculation data.

S307: The TEE 340a provides the encrypted HWAC calculation data to the baseband node 300a.

S308: The baseband node 300a forwards the encrypted HWAC calculation data to the network planner node 200.

S309: The network planner node 200 forwards the encrypted HWAC calculation data to its TEE 240.

S310: The TEE 240 calculates the HWAC.

S311: The TEE 240 signs the thus calculated HWAC to prove that the HWAC has been calculated by a bona fide TEE.

S312: The TEE 240 responds to its network planner node 200 with the thus signed HWAC.

S313: The network planner node 200 forwards the signed HWAC to the baseband node 300a.

S314: The baseband node 300a forwards the signed HWAC to its TEE 340a.

S315: The TEE 340 verifies correctness of the HWAC.

S316: The TEE 340 indicates to its baseband node 300a that the correctness of the HWAC has been successfully verified.

S317: The baseband node 300a triggers activation of hardware resources corresponding to the HWAC and provides a notification thereof to the network planner node 200.

S318: The network planner node 200 stores the signed HWAC in a storage 400 for later use (such as for verification).

S319: The network planner node 200 initiates utilization of the hardware resources.

The above steps S310-S319 can be repeated between the network planner node 200 and another baseband node 300b-300N as needed.

Figure 5:
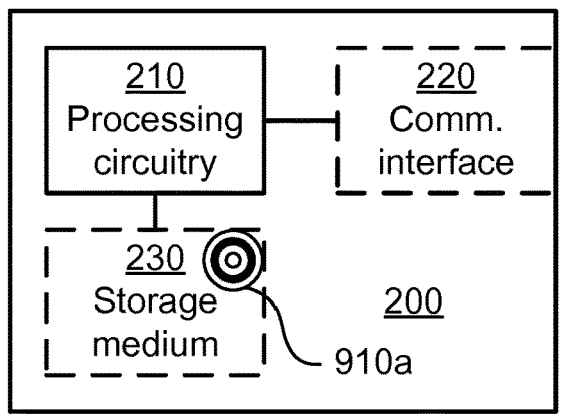
FIG. 5 is a schematic diagram showing functional units of a network planner node according to an embodiment.

FIG. 5 schematically illustrates, in terms of a number of functional units, the components of a network planner node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910a (as in FIG. 9), e.g. in the form of a storage medium 230. The processing circuitry 210 may further be provided as at least one application specific integrated circuit (ASIC), or field programmable gate array (FPGA). The processing circuitry 210 might comprise a secure area that holds the TEE 240.

Particularly, the processing circuitry 210 is configured to cause the network planner node 200 to perform a set of operations, or steps, as disclosed above. For example, the storage medium 230 may store the set of operations, and the processing circuitry 210 may be configured to retrieve the set of operations from the storage medium 230 to cause the network planner node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The network planner node 200 may further comprise a communications interface 220 for communications with other entities, functions, nodes, and devices, such as the baseband nodes 300a, 300b, 300N, the storage 400, the mobile network operator database 500, and the customer database 600. As such the communications interface 220 may comprise one or more transmitters and receivers, comprising analogue and digital components.

The processing circuitry 210 controls the general operation of the network planner node 200 e.g. by sending data and control signals to the communications interface 220 and the storage medium 230, by receiving data and reports from the communications interface 220, and by retrieving data and instructions from the storage medium 230. Other components, as well as the related functionality, of the network planner node 200 are omitted in order not to obscure the concepts presented herein.

Figure 6:
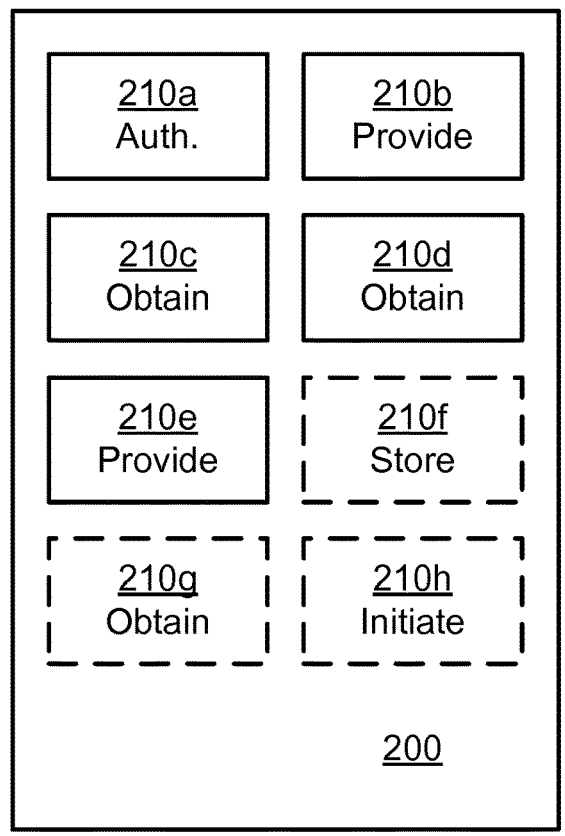
FIG. 6 is a schematic diagram showing functional modules of a network planner node according to an embodiment.

FIG. 6 schematically illustrates, in terms of a number of functional modules, the components of a network planner node 200 according to an embodiment. The network planner node 200 of FIG. 6 comprises a number of functional modules; an authentication module 210a configured to perform step S102, a provide module 210b configured to perform step S104, an obtain module 210C configured to perform step S106, an obtain module 210d configured to perform step S108, and a provide module 210e configured to perform step S110. The network planner node 200 of FIG. 6 may further comprise a number of optional functional modules, such as any of a store module 210f configured to perform step S112, an obtain module 210g configured to perform step S114, and an initiate module 210h configured to perform step S116. In general terms, each functional module 210a-210h may be implemented in hardware or in software. Preferably, one or more or all functional modules 210a-210h may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210h and to execute these instructions, thereby performing any steps of the network planner node 200 as disclosed herein. In some aspects the functional modules 210a-210h are executed on the TEE 240 of the network planner node 200.

Figure 7:
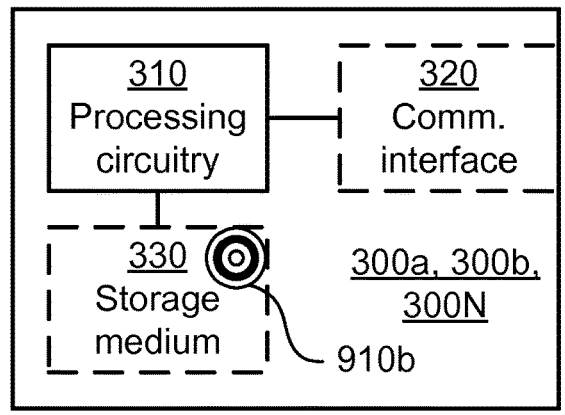
FIG. 7 is a schematic diagram showing functional units of a baseband node according to an embodiment.

FIG. 7 schematically illustrates, in terms of a number of functional units, the components of a baseband node 300a, 300b, 300N according to an embodiment. Processing circuitry 310 is provided using any combination of one or more of a suitable central processing unit (CPU), multiprocessor, microcontroller, digital signal processor (DSP), etc., capable of executing software instructions stored in a computer program product 910b (as in FIG. 9), e.g. in the form of a storage medium 330. The processing circuitry 310 may further be provided as at least one application specific integrated circuit (ASIC), or field programmable gate array (FPGA). The processing circuitry 310a might comprise a secure area that holds the TEE 340a, 340b, 340N.

Particularly, the processing circuitry 310 is configured to cause the baseband node 300a, 300b, 300N to perform a set of operations, or steps, as disclosed above. For example, the storage medium 330 may store the set of operations, and the processing circuitry 310 may be configured to retrieve the set of operations from the storage medium 330 to cause the baseband node 300a, 300b, 300N to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The baseband node 300a, 300b, 300N may further comprise a communications interface 320 for communications with entities, functions, nodes, and devices, such as the network planner node 200 and the network management node 700. As such the communications interface 320 may comprise one or more transmitters and receivers, comprising analogue and digital components.

The processing circuitry 310 controls the general operation of the baseband node 300a, 300b, 300N e.g. by sending data and control signals to the communications interface 320 and the storage medium 330, by receiving data and reports from the communications interface 320, and by retrieving data and instructions from the storage medium 330. Other components, as well as the related functionality, of the baseband node 300a, 300b, 300N are omitted in order not to obscure the concepts presented herein.

Figure 8:
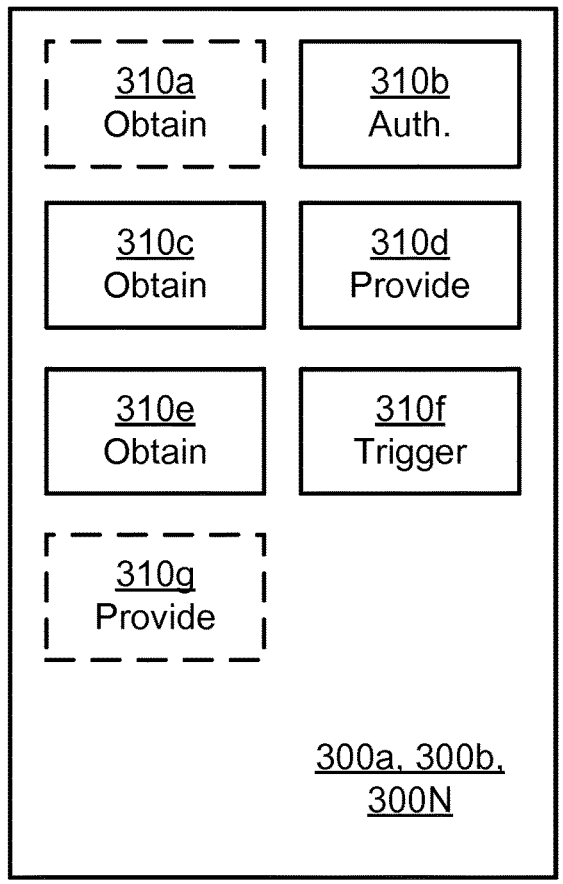
FIG. 8 is a schematic diagram showing functional modules of a baseband node according to an embodiment.

FIG. 8 schematically illustrates, in terms of a number of functional modules, the components of a baseband node 300a, 300b, 300N according to an embodiment. The baseband node 300a, 300b, 300N of FIG. 8 comprises a number of functional modules; an authentication module 310b configured to perform step S204, an obtain module 310c configured to perform step S206, a provide module 310d configured to perform step S208, an obtain module 310e configured to perform step S210, and a trigger module 310f configured to perform step S112. The baseband node 300a, 300b, 300N of FIG. 8 may further comprise a number of optional functional modules, such as any of an obtain module 310a configured to perform step S202, and a provide module 310g configured to perform step S214. In general terms, each functional module 310a-310g may be implemented in hardware or in software. Preferably, one or more or all functional modules 310a-310g may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310g and to execute these instructions, thereby performing any steps of the baseband node 300a, 300b, 300N as disclosed herein. In some aspects the functional modules 310a-310g are executed on the TEE 340a, 340b, 340N of the baseband node 300a, 300b, 300N.

The network planner node 200 and/or baseband node 300a, 300b, 300N may be provided as a standalone device or as a part of at least one further device. For example, the network planner node 200 and/or baseband node 300a, 300b, 300N may be provided in a node of a radio access network or in a node of the core network. Alternatively, functionality of the network planner node 200 and/or baseband node 300a, 300b, 300N may be distributed between at least two devices, or nodes. These at least two nodes, or devices, may either be part of the same network part (such as the radio access network or the core network) or may be spread between at least two such network parts.

Thus, a first portion of the instructions performed by the network planner node 200 and/or baseband node 300a, 300b, 300N may be executed in a first device, and a second portion of the of the instructions performed by the network planner node 200 and/or baseband node 300a, 300b, 300N may be executed in a second device; the herein disclosed embodiments are not limited to any particular number of devices on which the instructions performed by the network planner node 200 and/or baseband node 300a, 300b, 300N may be executed. Hence, the methods according to the herein disclosed embodiments are suitable to be performed by a network planner node 200 and/or baseband node 300a, 300b, 300N residing in a cloud computational environment. Therefore, although a single processing circuitry 210, 310 is illustrated in FIGS. 5 and 7 the processing circuitry 210, 310 may be distributed among a plurality of devices, or nodes. The same applies to the functional modules 210a-210h, 310a-310g of FIGS. 6 and 8 and the computer programs 920a, 920b of FIG. 9.

Figure 9:
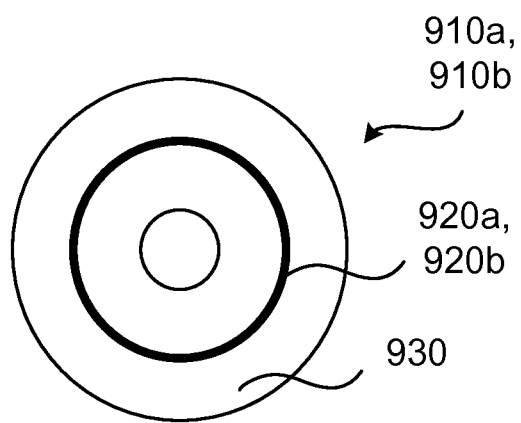
FIG. 9 shows one example of a computer program product comprising computer readable means according to an embodiment.

FIG. 9 shows one example of a computer program product 910a, 910b comprising computer readable means 930. On this computer readable means 930, a computer program 920a can be stored, which computer program 920a can cause the processing circuitry 210 and thereto operatively coupled entities and devices, such as the communications interface 220 and the storage medium 230, to execute methods according to embodiments described herein. The computer program 920a and/or computer program product 910a may thus provide means for performing any steps of the network planner node 200 as herein disclosed. On this computer readable means 930, a computer program 920b can be stored, which computer program 920b can cause the processing circuitry 310 and thereto operatively coupled entities and devices, such as the communications interface 320 and the storage medium 330, to execute methods according to embodiments described herein. The computer program 920b and/or computer program product 901b may thus provide means for performing any steps of the baseband node 300a, 300b, 300N as herein disclosed.

In the example of FIG. 9, the computer program product 910a, 910b is illustrated as an optical disc, such as a CD (compact disc) or a DVD (digital versatile disc) or a Blu-Ray disc. The computer program product 910a, 910b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Mash memory. Thus, while the computer program 920a, 920b is here schematically shown as a track on the depicted optical disk, the computer program 920a, 920b can be stored in any way which is suitable for the computer program product 910a, 910b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for obtaining a hardware activation code (HWAC) for a baseband node, the method comprising a network planner node:
performing mutual authentication between a trusted execution environment (TEE) of the network planner node and a TEE of the baseband node;
sending, to the TEE of the baseband node, a request for HWAC calculation data based on a network resource need;
receiving the requested HWAC calculation data from the TEE of the baseband node;
obtaining the HWAC by inputting the obtained HWAC calculation data and a quantification of the network resource need to a HWAC calculation function on the TEE of the network planner node, wherein the HWAC calculation function provides a mapping of the HWAC calculation data and the quantification of the network resource need to a given HWAC; and wherein the HWAC is given as output from the HWAC calculation function;
sending the HWAC to the TEE of the baseband node; and
wherein the baseband node comprises at least a part of a radio access network node.

2. The method of claim 1, further comprising storing the HWAC in a storage outside the TEE of the network planner node.

3. The method of claim 1:
wherein the request is accompanied by the quantification of the network resource need; and
wherein the requested HWAC calculation data only is valid for the quantification of the network resource need.

4. The method of claim 1, further comprising:
receiving a notification from the baseband node that activation of hardware resources corresponding to the HWAC has been triggered; and
in response to the notification, initiating utilization of the hardware resources to fulfil the network resource need.

5. The method of claim 1, wherein the HWAC calculation data is part of tabularized HWAC calculation data.

6. The method of claim 1:
wherein the HWAC calculation data received from the TEE of the baseband node is encrypted; and
wherein the HWAC calculation data is decrypted on the TEE of the network planner node before being inputted to the HWAC calculation function.

7. The method of claim 1:
wherein the HWAC is signed using a key on the TEE of the network planner node before being provided towards the TEE of the baseband node; and
wherein the key is shared between the TEE of the network planner node and the TEE of the baseband node.

8. The method of claim 1, wherein the network resource need is given by mobile network operator data.

9. The method of claim 1, wherein quantification of at least one further parameter is inputted to the HWAC calculation function.

10. The method of claim 1, wherein the HWAC calculation function is provided as mapping between a given combination of HWAC calculation data and quantification of network resource need and a given HWAC.

11. A method for verifying a hardware activation code (HWAC), the method comprising a baseband node:
performing mutual authentication between a trusted execution environment (TEE) of the baseband node and a TEE of a network planner node;
receiving, from the TEE of the network planner node, a request for HWAC calculation data;
sending, to the TEE of the network planner node, the requested HWAC calculation data;
receiving the HWAC from the TEE of the network planner node;
triggering activation of hardware resources corresponding to the HWAC only when having successfully verified correctness of the HWAC in a HWAC verification function on the TEE of the baseband node; and
wherein the baseband node comprises at least a part of a radio access network node.

12. The method of claim 11:
wherein the request is accompanied by a quantification of the network resource need; and
wherein only the HWAC calculation data valid for the quantification of the network resource need is provided towards the TEE of the network planner node.

13. The method of claim 11, further comprising sending a notification to the network planner node that the activation of the hardware resources has been triggered.

14. The method of claim 11, wherein the HWAC calculation data is part of tabularized HWAC calculation data.

15. The method of claim 11, wherein the HWAC calculation data is encrypted on the TEE of the baseband node before being sent to the TEE of the network planner node.

16. The method of claim 11:
wherein the HWAC received from the network planner node is signed using a key; and
wherein the key is shared between the TEE of the network planner node and the TEE of the baseband node.

17. The method of claim 11:
wherein each possible HWAC corresponds to a respective utility level in a set of utility values, each utility level corresponding to an amount of the hardware resources; and
wherein a utility level of the HWAC obtained from the TEE of the network planner node is mapped to its corresponding amount of the hardware resources.

18. The method of claim 11, further comprising obtaining the HWAC calculation data from a network management node.

19. A network planner node for obtaining a hardware activation code (HWAC) for a baseband node, the network planner node comprising:
processing circuitry;
memory containing instructions executable by the processing circuitry whereby the network planner node is operative to:
perform mutual authentication between a trusted execution environment (TEE) of the network planner node and a TEE of the baseband node;
send, to the TEE of the baseband node, a request for HWAC calculation data based on a network resource need;
receive, from the TEE of the baseband node, the requested HWAC calculation data;
obtain the HWAC by inputting the obtained HWAC calculation data and a quantification of the network resource need to a HWAC calculation function on the TEE of the network planner node, wherein the HWAC calculation function provides a mapping of the HWAC calculation data and the quantification of the network resource need to a given HWAC; and
wherein the HWAC is given as output from the HWAC calculation function;
send the HWAC to the TEE of the baseband node; and
wherein the baseband node comprises at least a part of a radio access network node.

20. A baseband node for verifying a hardware activation code, HWAC, the baseband node comprising processing circuitry, the processing circuitry being configured to cause the baseband node to:
processing circuitry;
memory containing instructions executable by the processing circuitry whereby the baseband node is operative to:
perform mutual authentication between a trusted execution environment (TEE) of the baseband node and a TEE of a network planner node;
receive, from the TEE of the network planner node, a request for HWAC calculation data;
send, to the TEE of the network planner node, the requested HWAC calculation data;

receive the HWAC from the TEE of the network planner node;
trigger activation of hardware resources corresponding to the HWAC only when having successfully verified correctness of the HWAC in a HWAC verification function on the TEE of the baseband node; and
wherein the baseband node comprises at least a part of a radio access network node.

\* \* \* \* \*